United States Patent [19]

Franklin et al.

[11] Patent Number: 6,000,832
[45] Date of Patent: Dec. 14, 1999

[54] ELECTRONIC ONLINE COMMERCE CARD WITH CUSTOMER GENERATED TRANSACTION PROXY NUMBER FOR ONLINE TRANSACTIONS

[75] Inventors: D. Chase Franklin, Seattle; Daniel Rosen, Bellevue; Josh Benaloh; Daniel R. Simon, both of Redmond, all of Wash.

[73] Assignee: Microsoft Corporation, Redmond, Wash.

[21] Appl. No.: 08/935,485

[22] Filed: Sep. 24, 1997

[51] Int. Cl.$^6$ ...................................................... G06F 17/00
[52] U.S. Cl. ...................... 364/479.02; 235/379; 235/380
[58] Field of Search .................................. 235/379, 380; 364/479.02

[56] References Cited

U.S. PATENT DOCUMENTS 5,831,862 11/1998 Hetricue et al. .................... 364/479.02

*Primary Examiner*—Harold I. Pitts
*Attorney, Agent, or Firm*—Lee & Hayes, PLLC

[57] ABSTRACT

An online commerce system facilitates online commerce over a public network using an online commerce card. The "card" does not exist in physical form, but instead exists in digital form. It is assigned a customer account number that includes digits for a prefix number for bank-handling information, digits for a customer identification number, digits reserved for an embedded code number, and a digit for check sum. The bank also gives the customer a private key. During an online transaction, the customer computer retrieves the private key and customer account number from storage. The customer computer generates a code number as a function of the private key, customer-specific data (e.g, card-holder's name, account number, etc.) and transaction-specific data (e.g., transaction amount, merchant ID, goods ID, time, transaction date, etc.). The customer computer embeds the code number in the reserved digits of the customer account number to create a transaction number specific to the transaction. The customer submits that transaction number to the merchant as a proxy for a regular card number. When the merchant submits the number for approval, the issuing institution recognizes it as a proxy transaction number, indexes the customer account record, and looks up the associated private key and customer-specific data. The institution computes a test code number using the same function and input parameters as the customer computer. The issuing institution compares the test code number with the code number embedded in the transaction number. If the two numbers match, the issuing institution accepts the transaction number as valid.

53 Claims, 5 Drawing Sheets

TRANSACTION PHASE

AUTHORIZATION PHASE

ELECTRONIC ONLINE COMMERCE CARD WITH CUSTOMER GENERATED TRANSACTION PROXY NUMBER FOR ONLINE TRANSACTIONS

TECHNICAL FIELD

This invention relates to systems and methods for facilitating online commerce over a public network (such as the Internet or an Interactive TV/Cable Network) using credit cards, debit cards, and other types of financial/banking cards. More particularly, this invention relates to systems and methods for conducting online transactions using an electronically realizable card that enables a customer to generate temporary transaction numbers on a transactional basis that are embedded in a "normal"-looking card account number.

BACKGROUND OF THE INVENTION

Online commerce is experiencing dramatic growth in recent years. More merchants are developing sites on the World Wide Web (or simply "WWW" or "Web") that consumers can access and order goods and/or services. It is fairly common for a consumer to browse a merchant's catalog, select a product, place an order for the product, and pay for the product all electronically over the Internet.

Typically, the consumer pays for the goods and/or services ordered over the Internet with a credit card. During the online transaction, the merchant sends an order form and requests the consumer to enter personal data (e.g., name, address, and telephone number) and credit card information (e.g., account number and expiration date). The consumer returns the completed order form containing the credit card information to the merchant over the Internet. The merchant verifies that the credit card number is valid and can be charged the payment amount. The card verification is usually conducted on a well-established card network, such as the VisaNet® network or the Veriphone® network.

One problem with this traditional online commerce model concerns the security of the credit card data as it travels over the Internet. The credit card information can be intercepted in route, copied into a database, and used to make unauthorized purchases. In an automated environment, an imposter can repeatedly use the stolen credit card data to conduct many online transactions before the consumer ever becomes aware that the credit card data has been stolen.

Another concern is that dishonest merchants may re-use or re-distribute an individual's credit card information.

It would be desirable to develop a new online commerce model that reduces or eliminates the incentive for stealing credit card data. Ideally, a secure online commerce model would render the credit card data hard to steal, and if stolen, worthless to the thief.

A further concern is that any new online commerce model should integrate well with existing proprietary card network systems. There are well-established systems that verify credit card purchases and subsequently settle accounts. These systems and associated protocols are entrenched in the merchant and banking communities and experience a high level of acceptance and trust. A new online commerce model should not usurp these systems, nor require merchants to change their existing practices to implement completely different systems and protocols.

The inventors have developed a card-based online commerce system that improves security and integrates with existing card verification and settlement systems.

SUMMARY OF THE INVENTION

This invention concerns a system and method for facilitating online commerce over a public network (such as the Internet or Interactive TV/Cable Network) using an online commerce card. The "card" of this system does not exist in physical form, but instead exists in a digital form that can be electronically realized for online commerce.

The online commerce card is issued electronically to a customer by an issuing institution, such as a bank or third party certifying authority. The issued card is assigned a permanent customer account number that is maintained on behalf of the customer by the issuing institution. The N-digit customer account number includes digits for a prefix number for bank-handling information, digits for a customer identification number, digits reserved for an embedded code number, and a digit for a check sum. The customer account number and a private key unique to the customer are issued to the customer. The issuing bank also supplies a software module used to create the embedded code number for each online commerce transaction.

When the customer desires to conduct an online transaction, the customer invokes the software module and enters a "weak" password, PIN (personal identification number), or pass phrase to obtain access to the module. If the password is proper, the customer computer retrieves the private key and customer account number from storage. The customer computer then generates a code number as a function of the private key, customer-specific data (e.g., card-holder's name, account number, etc.) and transaction-specific data (e.g., transaction amount, merchant ID, goods ID, time, transaction date, etc.). The customer computer embeds the code number in the digits reserved in the customer account number to effectively create a temporary transaction number that is specific to one transaction. The customer submits that transaction number to the merchant as a proxy for the customer account number during the transaction.

The transaction number looks like a real card number. In the credit card case, the transaction number has the same format and 16 digits as a regular credit card number. To the merchant, the transaction number is treated the same as any regular credit card number. The merchant handles the proxy transaction number according to traditional protocols, including seeking authorization from the issuing institution to honor the card number.

During the authorization phase, the merchant submits an authorization request containing the transaction number and the transaction-specific data to the issuing institution for approval. The issuing institution recognizes the number as a proxy transaction number for an online commerce card. The issuing institution uses the customer identification number contained within the transaction number to index the customer account record and lookup the associated private key and customer-specific data. The issuing institution then computes its own test code number using the same function utilized by the customer computer and the same input parameters (i.e., the private key, the customer-specific data from the account record, and the transaction-specific data received in the authorization request).

The issuing institution compares the test code number with the code number embedded in the transaction number. If the two numbers match, the issuing institution accepts the transaction number as valid and authentic.

The issuing institution substitutes an internal customer account number for the transaction number and processes the authorization request. In this manner, the issuing institution can use its existing processing system to check account information, spending limits, and so forth. Once the authorization request is processed, the issuing institution once again exchanges the transaction number for the customer account number and sends an authorization reply back to the merchant under the transaction number.

As a result, the merchant never needs to know if the number is a legitimate card account number, or a proxy number for a card account number. The merchant does not need to implement any new devices, software, or protocols to participate in the new online commerce system.

The online commerce system substantially reduces the value of a stolen number since the transaction number that is held by the merchant and transmitted over the Internet (or other network) is only a proxy number for a single purchase. Stealing the proxy number would not greatly benefit a thief because it cannot be repeatedly used for other purchases or transactions. In addition, the system seamlessly integrates with existing card verification and settlement protocols. Software modules are implemented at the customer and issuing institution, but no additional components are implemented at the merchant, settlement participants, or any other member in the online commerce transaction.

BRIEF DESCRIPTION OF THE DRAWINGS

The same reference numbers are used throughout the figures to reference like components and features.

FIG. 2 shows an information exchange between the customer computing unit and the bank computing center during an online commerce card registration phase.

FIG. 3 shows an information exchange between the customer computing unit and merchant computing unit during a transaction request phase.

FIG. 7 shows an information exchange between the merchant computing unit and the bank computing center during a payment authorization phase.

DETAILED DESCRIPTION

The following discussion assumes that the reader is familiar with cryptography. For a basic introduction of cryptography, the reader is directed to a text written by Bruce Schneier and entitled "Applied Cryptography: Protocols, Algorithms, and Source Code in C," published by John Wiley & Sons with copyright 1994 (with a second edition in 1996), which is hereby incorporated by reference.

Figure 1:
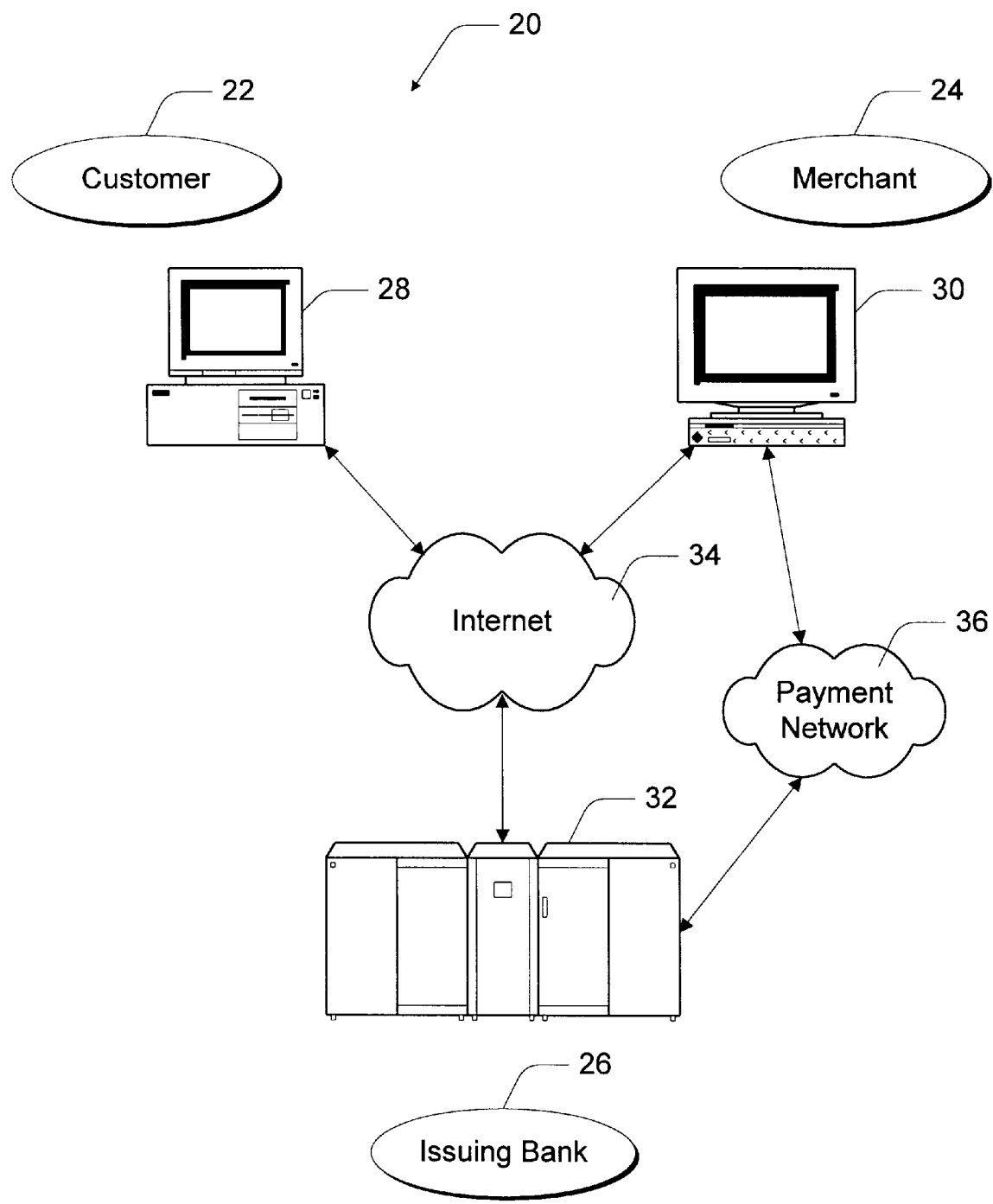
FIG. 1 is a diagrammatic illustration of an online commerce system.

FIG. 1 shows an online commerce system 20 for conducting online commerce transactions. For general discussion purposes, three participants to an online commerce transaction are shown: a customer 22, a merchant 24, and an issuing bank 26. These three participants play the primary roles in the online commerce transaction. The customer and merchant may represent individual people, entities, or businesses. Although labeled as a "bank", the issuing bank 26 may represent other types of card-issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing system to facilitate online commerce transactions. The customer 22 has a computing unit 28 in the form of a personal computer, although other types of computing units may be used including laptops, notebooks, handheld computers, set-top boxes, and the like. The merchant 24 has a computing unit 30 implemented in the form of a computer server, although other implementations are possible. The bank 26 has a computing center 32 shown as a mainframe computer. However, the bank computing center 32 may be implemented in other forms, such as a minicomputer, a PC server, a networked set of computers, and the like.

The computing units 28, 30, and 32 are connected with each other via a data communication network 34. The network 34 is a public network and assumed to be insecure and open to eavesdroppers. In the illustrated implementation, the network is embodied as the Internet. In this context, the computers may or may not be connected to the Internet 34 at all times. For instance, the customer computer 28 may employ a modem to occasionally connect to the Internet 34, whereas the bank computing center 32 might maintain a permanent connection to the Internet 34. It is noted that the network 34 may be implemented as other types of networks, such as an interactive television (ITV) network.

The merchant computer 30 and the bank computer 32 may be interconnected via a second network, referred to as a "payment network" 36. The payment network 36 represents existing proprietary networks that presently accommodate transactions for credit cards, debit cards, and other types of financial/banking transactions. The payment network 36 is closed network that is assumed to be secure from eavesdroppers. Examples of the payment network 36 include the VisaNet® network and the Veriphone® network.

The electronic commerce system 20 is implemented at the customer 22 and issuing bank 26. In the preferred implementation, the electronic commerce system 20 is implemented as computer software modules loaded onto the customer computer 28 and the bank computing center 32. The merchant computer 30 does not require any additional software to participate in the online commerce transaction supported by the online commerce system 20.

General Operation

There are three distinct phases supported by the online commerce system 20: a registration phase, a transaction phase, and a payment-authorization phase. During the registration phase, the customer 22 requests an online commerce card from the issuing bank 26. The issuing bank 26 creates an online commerce card for the customer and assigns a customer account number to the card. Additionally, a customer-related secret, such as a private encryption key unique to the customer, is associated with the online commerce card. This customer-related secret can be generated by the issuing bank or selected by the customer. The customer account number and private key are retained in a customer account data record at the issuing bank 26.

The "online commerce card" does not necessarily exist in physical form, but in digital form for use in online transactions. The N-digit customer account number assigned to the online commerce card includes digits for a prefix number for bank-handling information, digits for a customer identification number, digits for an embedded code number, and a digit for a check sum. The number of digits for each portion of the number vary depending upon the card format and control parameters. The commerce card can be configured, for example, to resemble a credit card, a debit card, a bank card, or other type of financial services card. Specific digit formats compatible with a standard 16-digit credit card number are discussed below with reference to FIGS. 5 and 6.

The customer account number and customer-related secret are also stored at the customer computer in a password-secured storage location. The issuing bank supplies a software module used to create an embedded code number for each online commerce transaction on the Internet 34. It is noted, however, that the software module may alternatively be packaged as part of can operating system or other product. In this alternative case, the customer may only need an account number and a private key from the issuing bank. The registration phase is described below in more detail with reference to FIG. 2.

During the transaction phase, the customer 22 invokes the software module and enters a weak password to gain access to the secure storage location. If the password is correct, the customer computer retrieves the private key and customer account number from storage. The customer computer generates a code number as a function of the private key, customer-specific data (e.g., card-holder's name, account number, etc.) and transaction-specific data (e.g., transaction amount, merchant ID, goods ID, time, transaction date, etc.). Preferably, the customer computer uses a cryptographic hashing function to create a unique, multi-digit MAC (message authentication code) from the various input parameters. The customer computer embeds the code number (or MAC) in the reserved digits of the customer account number to create a temporary transaction number that is specific to a single transaction. It may also be necessary to produce a "check sum" consistent with a proper credit card number.

The customer submits the transaction number, with embedded MAC, to the merchant as a proxy for the customer account number during the transaction. The transaction number resembles a real account number. In the case of a credit card, for example, the transaction number resembles a 16-digit, mod 10, credit card number identically formatted with four spaced sets of 4-digits. To the customer, merchant, and every other participant in the transaction, the transaction number appears to be a valid credit card number. Only the issuing bank 26 needs to differentiate the transaction numbers from other real customer account numbers. The customer 22 uses the proxy transaction number in the transaction with the merchant 24. Since the transaction number is issued in place of the customer number for only a single transaction and with a limited life, a thief that intercepts the transaction number is prevented from using it for illicit gain. The transaction phase is described below in more detail with reference to FIGS. 3–6.

During the payment authorization phase, the merchant 24 submits an authorization over the conventional payment network 36 to the issuing bank 26 for approval. The authorization request contains the transaction number and the transaction-specific data. The issuing bank 26 identifies the number as a transaction number, as opposed to a real customer account number. The issuing bank 26 locates the customer's data record using the prefix and customer identification portions of the transaction number. The issuing bank 26 retrieves the customer-related secret (i.e., the customer's private key) and customer-specific data from the account data record. The issuing bank 26 then computes a test code number (i.e., a test MAC) as a function of the private key, the customer-specific data, and the transaction-specific data. The issuing bank uses the same cryptographic hashing function as the customer computers. If the test MAC matches the MAC contained in the transaction number received with the authorization request, the issuing bank accepts the authorization request, swaps the customer account number for the transaction number, and processes the request using the customer account number.

After the processing, the issuing bank 26 substitutes the transaction number back for the customer account number and returns the authorization reply to the merchant 24 under the transaction number. In this manner, only the issuing bank is aware that the transaction number is a proxy for the customer account number. The merchant 24 need not be aware that the transaction number is not a true customer account number, but simply handles the number its it would any other card number. The authorization phase is described below in more detail with reference to FIG. 7.

Registration Phase

Figure 2:
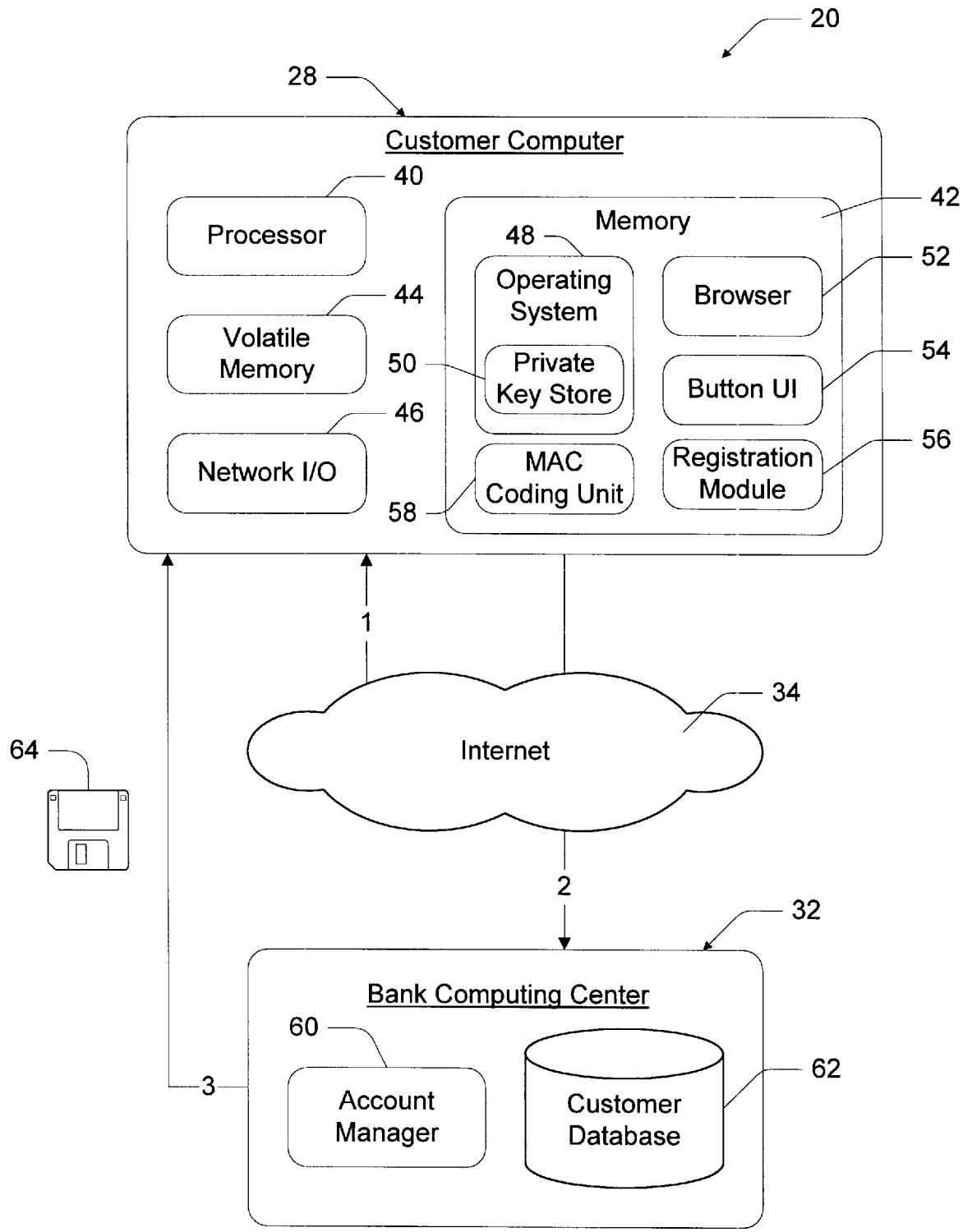
FIG. 2 is a block diagram of a customer computing unit and bank computing center.

FIG. 2 shows the online commerce system 20 during a registration phase. This phase involves the customer 22 requesting an online commerce card from the issuing bank 26, and the issuing bank creating and issuing the online commerce card to the customer. The information exchange between the customer computer 28 and the bank computer 32 during the registration phase are illustrated as enumerated lines between the two entities.

The customer computer 28 has a central processing unit comprising a processor 40, a volatile memory 44 (e.g., RAM), and a non-volatile memory 42 (e.g., ROM, hard disk drive, floppy disk drive, CD-ROM, etc.). The customer computer 28 also has a network I/O 46 (input/output) for accessing the Internet 34. The network I/O 46 can be implemented, for example, as a dial-up modem or as a permanent network connection.

The customer computer 28 runs an operating system 48 that supports multiple applications. The operating system 48 is preferably a multitasking operating system that allows simultaneous execution of multiple applications in a graphical windowing environment. One preferred operating system is a Windows® brand operating system sold by Microsoft Corporation, such as Windows® 95, Windows® NT, Windows® CE, or other derivative versions of Windows®. It is noted, however, that other operating systems that provide windowing environments may be employed, such as the Macintosh operating system from Apple Computer, Inc.

The operating system 48 includes a private key store 50 to securely hold one or more private keys used for encryption, decryption, digital signing, and other cryptographic functions. The private key store 50 is a password-protected storage location that grants access upon entry of an appropriate password. The customer selects the password as part of the registration process.

Several software components are stored in memory 42 including a browser 52, a button user interface (UI) 54, a registration module 56, and a MAC coding unit 58. These software components load into volatile memory when launched and execute on the processor 40 atop the operating system 48. The browser software 52 originally exists on the customer computer 28, whereas the button UI 54, registration module 56, and MAC coding unit 58 may be supplied to the customer computer 28 during the registration process. It is further noted that the button UI 54 may be integrated into, or reliant on, the graphical user interfaces supported by the operating system 48, but is shown separately for explanation purposes.

The bank computer 32 has an account manager 60 and a customer database 62. The account manager 60 is preferably implemented in software that executes on the bank computer 32, such as a relational database program that manages the database 62.

The registration phase between the customer and issuing bank will now be described with respect to FIG. 2. During normal operation on the Web, the customer comes across a banner advertising an online commerce card sponsored by the issuing bank. The banner may be part of the bank's Web site, or part of a statement to its customers, or included as advertisement in other Web content. The customer activates the banner by clicking the banner icon with a mouse pointer. This action submits a request for an online commerce card application. In response, the customer downloads the registration module 56 from the Web to the customer computer 28. This initial registration step is illustrated by flow arrow 1 from the Internet 34 to the customer computer 28. It is also noted that the registration may be initiated by other means such as mail, broadcast, telephone, and so forth.

The registration module 56 automatically launches to aid the customer in the completion of the online application. The registration module is preferably configured to provide step-by-step instructions, such as a Help Wizard. The customer fills out various fields related to personal and financial matters and enters customer-specific data, such as name, address, telephone number, social security number, presently owned credit cards, bank affiliations, and the like.

The customer also supplies a password during registration. The customer-selected password will be used to unlock the private key store 50 to gain access to the private key or customer-related secret.

The customer completes the online commerce card application using the registration wizard and submits the application to the issuing bank (flow arrow 2 in FIG. 2). The registration module 56 facilitates this communication and any future interaction between the consumer and the issuing bank. The application itself, or the registration module 56, contains the necessary routing information to direct the application over the Internet 34 to the bank computing center 32. The issuing bank reviews the application to determine whether the customer is credit worthy and pending the analysis, whether to grant or deny a commerce card. If a new card is denied, the issuing bank returns a message to the customer indicating that the card application has been denied and no card will be issued. Conversely, if a new card is to be granted, the issuing bank returns a message indicating that a card will be granted assuming the remaining registration steps are satisfied.

Assuming that a card account is granted, the issuing bank creates a customer account record in the customer database 62 and assigns a customer account number to the data record. The customer account number uniquely associates all relevant database records to a specific customer. Ideally, the customer account number is some number that is compatible with the bank's existing processing system. In this manner, the bank can utilize its existing processing system that might rely on conventional account or card numbers.

For example, suppose the bank is issuing a credit card-like online commerce card having a 16-digit number. The account number assigned to the customer account might comprise the 16-digit number. The first five-to-seven digits are a bank related prefix, the next four digits are a customer identification number, the next four-to-six digits are reserved for a MAC number, and the last digit is a check sum value. During the registration phase, the four-to-six digits for the MAC number have no meaning (as they only have meaning in the context of a transaction), and hence, these digits are only placeholders in the customer account number. Thus, for the credit card example, one possible customer account number might be as follows:

1234 56789 1230 0004

The "0" digits represent placeholders where a uniquely generated MAC will eventually be embedded for each online transaction.

The customer account number may exist in other forms. For instance, if the customer already possesses a real credit card or debit card from the bank, the number from the credit card or debit card might be the customer account number. In this manner, the customer can use the digital online commerce card concurrently with the physical credit or debit card. As another implementation, the public key, private key, or a mathematical derivation of one or both keys (e.g., a hash value of one or both keys) might be employed to represent the customer account number. Another alternative is for the bank to generate an internal number that is used for solely for record keeping purposes.

The issuing bank adds the customer-specific data to the account record and associates the customer-related secret to the data account record. The issuing bank supplies the customer's password and a MAC coding unit 58 to the customer. The MAC coding unit 58 is a software module that generates the embedded code numbers in transaction card numbers. The issuing bank also supplies the button UI 54, which can be added to the browser's toolbar (and/or toolbars of other applications). The button UI 54 enables the customer to invoke a wizard when conducting an online commerce transaction. The issuing bank may digitally sign the public/private key pair so that the customer can verify that the signed key pair originated from the bank. One technique for forming this digital signature is to hash the one or both keys and encrypt the resulting hash value using the bank's private signing key.

In the preferred implementation, the bank supplies the private key, MAC coding unit 58, and button UI 54 using some means other than online transmission. FIG. 2 shows a floppy disk 64, which stores the private key and software, being mailed to the customer using conventional postal carriers (flow arrow 3 in FIG. 2). Using regular mail provides an added level of security in that the bank can verify through the mailing address that a customer having the registered name and address truly lives at the place inscribed on the online registration form. This increases the bank's confidence that the customer did not submit a fraudulent application. Another benefit is that the software on floppy disk 64 contains cryptographic modules. Providing the cryptography on a disk that is mailed to a U.S. address avoids the problem of unknowingly supplying cryptographic code to foreigners in a manner contrary to U.S export laws.

The customer receives a mailer one to ten days following application submittal. The customer loads the floppy diskette 64 and enters the password. If the password is correct, the private key is transferred to the secure private key store 50. The MAC coding unit 58 and button UI 54 are installed on the customer computer.

At this point, the customer has been issued an "online commerce card". The customer computer 28 and bank computing center 32 both store the customer's private key and any additional customer-related secrets, thereby establishing secrets that are known to both the customer and issuing bank.

The registration process is described as an interaction between the customer and an issuing bank. It is noted that a third party may handle some or all of the registration tasks on behalf of the bank. Such third parties are often referred to as "certifying authorities", "credential binders," "binding authorities," or simply "binders." However, for discussion purposes, the issuing bank is assumed to perform all of the functions of a bank and an issuing institution.

Transaction Phase

Figure 3:
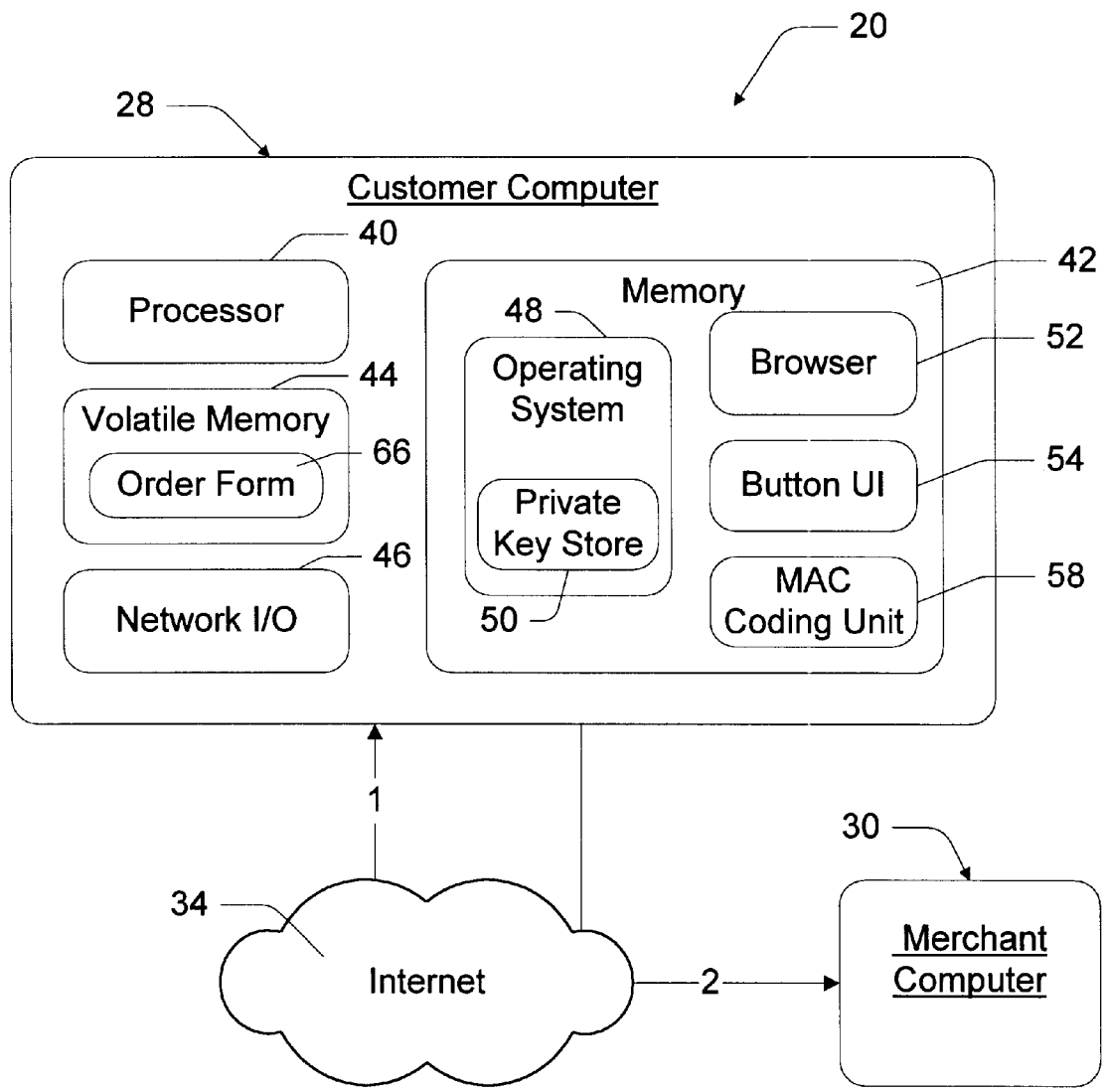
FIG. 3 is a block diagram of the customer computing unit and a merchant computing unit.

FIG. 3 shows the online commerce system 20 during a transaction phase. This phase involves the customer 22 engaging in an online commerce transaction with the merchant 24. The information exchange between the customer computer 28 and the merchant computer 30 during the transaction phase are illustrated as enumerated lines.

The customer invokes the browser 52 to surf the Web for a particular product or service, or to visit a Web site of a particular merchant. Suppose that the customer decides to commence an online transaction with the merchant, such as purchasing a product from the merchant. The customer downloads an order form 66 from the Web and stores it in volatile memory 44 (flow arrow 1 in FIG. 3). The order form 66 is typically configured as an HTML (hypertext markup language) form. The customer fills out the order form 66 to purchase a desired product or service from the merchant. The order form 66 includes a payment section that requires the customer to enter a method of payment, such as a credit card number, for payment of the goods.

Upon reaching this method of payment field, the customer clicks the "online commerce card" button UT 54 on the browser toolbar to invoke a wizard to guide the customer through the steps of generating a transaction number suitable for that transaction. A dialog box pops up on screen and requests entry of the customer's password. The customer types in the password. The operating system 48 checks the password prior to allowing access to the private key store 50. If the password is approved, the customer computer grants access to the secure private key store 50; otherwise, access is denied and the customer is prompted again. The dialog box may also request entry of transaction-specific data, such as transaction time, transaction amount, transaction date, merchant identification, goods identification, and so forth. If compatible, the wizard software invoked by the button UI 54 might automatically collect the transaction-specific data from the order form 66. Alternatively, the time parameter may be supplied by a third party service or from the issuing bank.

The transaction wizard calls the MAC coding unit 58 and inputs the private key (or other customer-related secret), the transaction-specific data, and any customer-specific data. The transaction-specific data and the customer-specific data both enhance the ability to generate a code number that is unique to one specific transaction between a particular customer and a particular merchant. It is noted, however, that these input parameters are pre-known or made available to both the customer and the merchant, without the customer and merchant communicating during the transaction.

Figure 4:
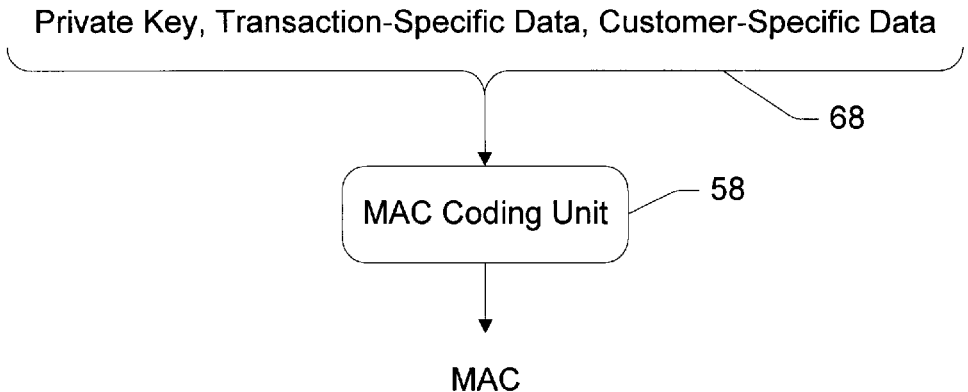
FIG. 4 is a functional block diagram of a unit for creating a code value based on a customer-related secret and transaction-specific data.

FIG. 4 shows the code number generation in more detail. The input parameters 68 are entered to the MAC coding unit 58, which then computes a MAC or code number as a function of the private key, the transaction-specific data, and the customer-specific data. Preferably, the coding unit 58 derives a code number according to a cryptographic hashing function of the input parameters 68 and the private key. The MAC is four-to-six digits long., depending upon the credit card format.

The customer computer concatenates the code number with the pre-known prefix and customer identification number of the customer account number. Put another way, the customer computer embeds the code number into the available places in the customer account number that are reserved for the code number. The customer computer then computes a check sum from the prefix, the customer identification number, and the code number, and appends the check sum. This process creates a transaction number with an embedded code number (or MAC) that is specific to the online commerce transaction with the merchant.

Figure 5:
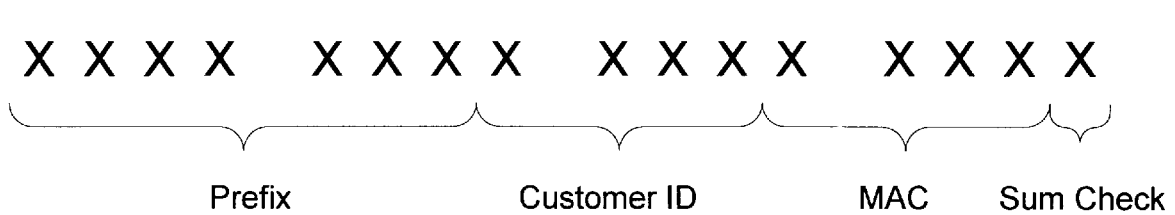
FIG. 5 is a diagrammatic illustration of a 16-digit customer account number according to one implementation.
Figure 6:
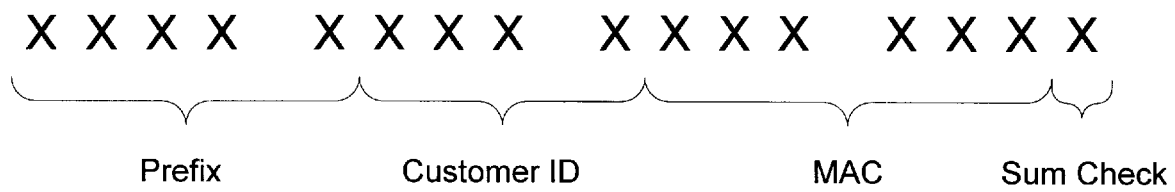
FIG. 6 is a diagrammatic illustration of a 16-digit customer account number according to another implementation.

FIGS. 5 and 6 show two different formats of a proxy transaction number that can be utilized in credit card-like transactions. Credit card numbers comply with a standardized format having four spaced sets of numbers, is represented by the number "XXXX XXXX XXXX XXXX". In FIG. 5, the transaction number 70 has a seven-digit prefix that is used for processing purposes. It identifies the issuing bank, the card type, and so forth. The prefix can also be mathematically derived to represent groups or blocks of customers. For instance, the prefix might be capable of distinguishing among 1,000 different possible groups of cardholders. A four-digit customer ID follows the prefix. This four-digit number identifies the customer. With four digits, the customer ID can identify 10,000 customers. By combining the prefix and customer ID, the first eleven digits in the transaction number 70 can be used to identify up to 10,000,000 unique customers. Accordingly, during the authorization phase (discussed below), the bank identifies the customer account record from the first eleven digits in the number.

The four-digit MAC follows the customer ID. This number is generated by the customer computer based on a unique set of input parameters, some of which are known only to the customer and bank. Finally, the one-digit check sum is appended to the MAC.

FIG. 6 shows a transaction number 72 with a slightly different format. Here, the prefix is shortened to five digits, yet still provides the customer block identification and processing information. The extra digits are added to the MAC to create a six-digit MAC. The additional digits improve the strength and uniqueness of the MAC for purposes of verifying the customer and the specific transaction.

Suppose, for example purposes, the MAC coding unit 58 generates a four-digit MAC of "8888" to embed in the number format of FIG. 5. The customer computer embeds the four-digit MAC into the placeholder spots of the customer account number to create the transaction number, as follows:

1234 5678 1230 0006 (Customer Acct. No.)

1234 5678 1238 8886 (Transaction No.)

The transaction number is valid for only one transaction and is designed to have a finite life. The shorter the duration, the less likelihood of fraud resulting from the transaction number being stolen and reused prior to the end of its life. The transaction number should remain valid long enough to insure that it has time to clear the entire processing network and payment made to the merchant, but not so long that it invites fraud. This would typically be between several hours and one week. Given that all merchant using the online commerce card are by definition connected, shorter periods would be normal. The financial institution can adjust this validity period to minimize the overall cost contributed by false rejections (because the number has already expired) and fraud.

The transaction number is presented in a graphical window to the customer. If the order form is compatible, the customer can click on an icon to have the number automatically entered into the merchant order form 66. Otherwise, in a worst case scenario, the customer manually enters the proxy transaction number into the merchant's HTML order form 66. Since the transaction number has the identical 16-digit format as a real credit card number, the customer enters the 16-digit number as if it were his/her real credit card number.

The user may also be required to enter an expiration date to satisfy the merchant order form 66. Essentially, the expiration date can be any future date that is not too far in the distant future, such as less than two to three years. The customer then submits the completed order form 66 over the Internet 34 to the merchant computer 30. This is represented by flow arrow 2 in FIG. 3.

The merchant 30 receives the transaction number from the Internet and processes the transaction number using its existing computer system. There are no software components added to the merchant computer as part of the online commerce system 20. Rather, the merchant computer 30 treats the transaction number of the online commerce card no differently than it treats a standard credit card number. In fact, the merchant computer 30 most likely will not be able to distinguish between the two types of numbers.

Authorization Phase

Figure 7:
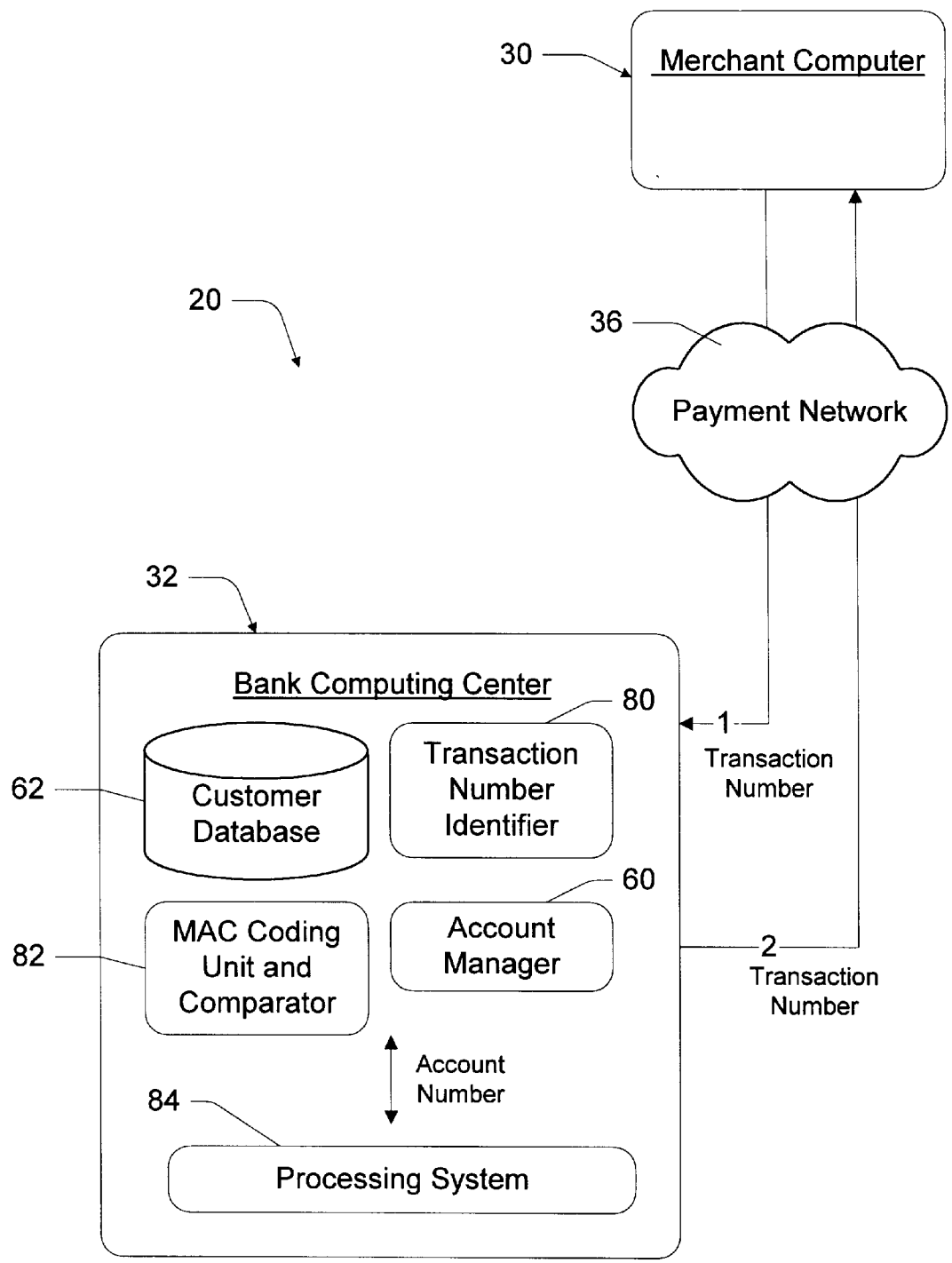
FIG. 7 is a block diagram of the bank computing center and the merchant computing unit.

FIG. 7 shows the online commerce system 20 during a payment authorization phase. This phase involves the merchant 24 seeking authorization from the issuing bank 26 to honor the customer's transaction number received by the merchant in the commerce transaction with the customer. The information exchanges between the merchant computer 30 and the bank computer 32 during the authorization phase are illustrated as enumerated lines.

The merchant computer 30 submits a request for authorization over a payment network 36 to the bank computing center 32 (flow arrow 1 in FIG. 7). The authorization request contains the transaction number and the transaction-specific data, such as the amount, time, date, merchant ID, goods ID, and so forth.

The FIG. 7 illustration is simplified for discussion purposes, as other participants will most likely be involved. For instance, the merchant computer 30 typically submits the request for authorization to its acquiring bank (not shown) by conventional means. The acquiring bank validates the authorization request by verifying that the merchant is a valid merchant and that the credit card number represents a valid number. The acquiring bank then forwards the authorization request to the issuing bank. The routing to the issuing bank via the payment network is handled through conventional techniques.

When the bank computer 32 receives the authorization request, it first examines the transaction number to determine whether it is a valid number. A transaction number identifier 80 executing at the bank computer 32 examines all incoming account numbers to segregate proxy transaction numbers from real credit card numbers. On a daily basis, it is likely that the bank computer 32 might handle many account numbers (on the order of tens or hundreds of thousands). Most of the numbers are expected to be real credit card account numbers. Only a small percentage is anticipated to be temporary transaction numbers. The transaction number identifier 80 filters out authorization requests that pertain to transaction numbers from authorization request that pertain to real customer account numbers. In the continuing example, the transaction number identifier 80 recognizes the number submitted by the merchant computer 30 as a transaction number based on the first five-to-seven digit prefix.

The transaction number identifier 80 passes the transaction number to the account manager 60. The account manager 60 uses the transaction number as an index to transaction records in the customer database 62. More particularly, the account manager 60 utilizes the prefix and customer ID portions of the transaction number (i.e., the first nine-to-eleven digits) to identify a customer account. If no records are found, the number is deemed invalid and the bank computer 32 returns a message disapproving the transaction to the merchant computer 30.

If a record is found, the account manager 60 retrieves the customer's private key and customer-related data from the customer data record. The account manager 60 also extracts the MAC from the transaction number. The account manager 60 submits the private key, the customer-related data, and the transaction-specific data to the MAC coding and comparator unit 82. The MAC coding and comparator unit 82 derives a test MAC from the private key, the customer-related data, and the transaction-specific data using the same function employed at the customer computer. Preferably, the same cryptographic hashing function is used. The MAC coding and comparator unit 82 compares the test MAC with the embedded MAC from the transaction number. If the two MACs match, the bank has a very high degree of certainty that the transaction number is valid and originated from the customer.

Once the transaction number is verified, the account manager 60 substitutes the customer account number in place of the transaction number in the merchant authorization request. The account manager 60 then submits the authorization request to the bank's traditional processing system 84 for normal authorization processing (e.g., confirm account status, credit rating, credit line, etc.).

After the request is processed, the processing system 84 returns an authorization response to the account manager 60. The account manager fetches the transaction number and substitutes the transaction number in place of the customer account number in the bank's authorization reply. The bank computing center 32 then returns the authorization reply to the merchant computer 30 via the payment network 36 (flow arrow 2 in FIG. 7). In this manner, the merchant always handles the transaction number as if it is a real credit card number.

The preceding steps assume the authorization request was successful. If that is the case, the credit limit of the customer's account is drawn down in the amount of the authorization, and the transaction is logged for future posting.

Settlement

During settlement, batches of transactions are submitted to a card association, which performs the following operations:

Edit/balance the batch transactions

Calculate the interchange fees

Verify the fees

Route chargeback transactions

Calculate net settlement

Distribute interchange files to the issuers

Transmit settlement advisements to the clearing) (issuer) banks

Transmit settlement to the settlement (card association) bank

The issuing bank receives a daily interchange file that contains all transactions submitted by merchants against customer accounts owned by the issuing bank for that day. In addition, the issuing bank also receives other settlement transactions such as chargebacks, retrieval requests, re-presentments, etc. The settlement process thus far is conventional.

When the settlement file references a transaction number, however, the account manager 60 performs essentially the same compute-and-compare process described above with respect to the authorization request. That is, the account manager computes a test MAC and compares it to the MAC embedded in the transaction number in the settlement file. If valid, the customer account manager 60 substitutes the customer account number for the transaction number in the batch and processes the batch using conventional means.

The online commerce system has many advantages. One advantage is that it substantially reduces the value of a stolen number since the number is only a proxy number for a single purchase. Stealing the proxy number would not greatly benefit a thief because it cannot be arbitrarily used for other purchases or transactions. Another benefit is that the system integrates with existing card verification and settlement protocols. All parties, except the issuing bank, are able to treat the transaction number of the online commerce card in the same manner in which they process a Visa®, MasterCard®, or other bank card transaction today. No additional processing software is needed at the merchants or settlement participants.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

We claim:

1. A method for facilitating online commerce, comprising the following steps:
   issuing an electronic commerce card to a customer during a registration phase, the commerce card having a customer account number and a customer-related secret associated therewith; and
   during an online commerce transaction phase, generating at the customer a proxy number suitable for the online commerce transaction, the proxy number resembling the customer account number but having embedded therein a code number derived at least in part on the customer-related secret.

2. A method as recited in claim 1, wherein the generating step comprises the step of deriving the embedded code number from the customer-related secret and transaction-specific data.

3. A method as recited in claim 1, wherein the generating step comprises the step of deriving the embedded code number from the customer-related secret and transaction-specific data, the transaction-specific data being selected from a group comprising time, transaction amount, transaction date, merchant identification, and goods identification.

4. A method as recited in claim 1, wherein the generating step comprises the step of computing the embedded code number from a cryptographic hashing function of the customer-related secret and transaction-specific data.

5. A method as recited in claim 1, wherein the generating step comprises the step of generating a 16-digit proxy number that resembles a credit card number, wherein some of the digits are used for the code number.

6. A method as recited in claim 1, wherein the generating step comprises the step of generating a 16-digit proxy number that resembles a credit card number, the proxy number having a five- to seven-digit prefix, a four-digit customer identification number, a four- to six-digit code number, and a one-digit check sum.

7. A method as recited in claim 1, wherein the generating step comprises the following steps:
   deriving the code number from the customer-related secret and transaction-specific data;
   concatenating the code number with a pre-known prefix and customer identification number;
   computing a check sum from the prefix, the code number and the customer identification number; and
   appending the check sum to the prefix, the code number and the customer identification number.

8. A method as recited in claim 1, wherein the generating step comprises the step of generating a proxy number having a finite period of time within which the proxy number can be used.

9. A method as recited in claim 1, wherein the issuing step is performed online.

10. A method as recited in claim 1, further comprising the step of using the proxy number during the online commerce transaction.

11. A method as recited in claim 1, wherein prior to the issuing step, the method comprises the following additional steps:
   initiating, from the customer, a request for the commerce card from an issuing authority; and
   downloading software code to the customer to assist in a card registration process.

12. A method as recited in claim 1, wherein prior to the issuing step, the method comprises the following additional steps:
   obtaining an application for the commerce card from an issuing authority;
   supplying as part of the application a customer-selected secret; and
   creating at the issuing institution a customer account having a customer identification number and the customer-selected secret associated therewith.

13. A method as recited in claim 1, wherein the step of issuing the commerce card comprises the step of supplying to the customer a private key unique to the customer and software code effective to compute the code number using the private key.

14. A method as recited in claim 1, wherein the step of issuing the commerce card comprises the step of supplying to the customer software code that supports a user interface button that invokes a user interface for generating the proxy number.

15. A graphical user interface embodied on a computer-readable medium that presents the user interface button as recited in claim 14.

16. An electronic commerce card embodied on a computer-readable medium that is created as a result of the steps in the method as recited in claim 1.

17. A computer-readable medium having computer-executable instructions for performing the steps in the method as recited in claim 1.

18. A computer programmed to perform the steps in the method as recited in claim 1.

19. A method for registering for an online commerce card, comprising the following steps:
   initiating, at the customer, a request for an online commerce card application;
   downloading software code from a card issuing authority to the customer to assist in completing the card application;

submitting the application for the commerce card from the customer to the issuing authority;

creating at the issuing institution a customer account for the customer, the customer account being associated with a customer identification number and a customer-related secret; and providing to the customer the customer-related secret, a customer account number that includes the customer identification number, and proxy number generating code, the proxy generating code being capable of creating a code number using the customer-related secret and embedding the code number into the customer account number to form a proxy number for use in place of the customer account number in an online commerce transaction.

20. A method as recited in claim 19, wherein the providing step comprises the step of providing a private key to the customer, the proxy number generating code using a cryptographic hashing function and the private key to create the code number.

21. A method as recited in claim 19, wherein the providing step comprises the step of supplying the customer account number, the customer-related secret, and the proxy number generating code to the customer by means other than online transmission.

22. A method as recited in claim 19, wherein the downloading step comprises downloading software code that supports a user interface button to invoke a user interface for facilitating online commerce transactions.

23. A graphical user interface embodied on a computer-readable medium that presents the user interface button as recited in claim 22.

24. Computer-readable media resident at the customer and the issuing authority having computer-executable instructions for performing the steps in the method as recited in claim 19.

25. A method for utilizing an online commerce card in conducting online commerce transactions between a customer and a merchant, the commerce card having a customer account number associated therewith, comprising the following steps:

generating a code number at the customer based at least in part on a customer-related secret;

embedding the code number in the customer account number;

sending the customer account number with embedded code number to the merchant to commence the online commerce transaction.

26. A method as recited in claim 25, wherein the generating step comprises the step of deriving the code number from the customer-related secret and transaction-specific data.

27. A method as recited in claim 25, wherein the generating step comprises the step of deriving the code number from the customer-related secret and transaction-specific data, the transaction-specific data being selected from a group comprising time, transaction amount, transaction date, merchant identification, and goods identification.

28. A method as recited in claim 25, wherein the generating step comprises the step of generating the code number from a cryptographic hashing function of the customer-related secret and transaction-specific data.

29. A method as recited in claim 25, wherein the customer-related secret is a private key and the generating step comprises the step of generating the code number from a cryptographic hashing function of the private key and transaction-specific data.

30. A method as recited in claim 25, wherein the generating and embedding steps yield a 16-digit customer account number that resembles a credit card number, but includes an embedded code number.

31. A method as recited in claim 25, wherein the generating and embedding steps yield a 16-digit customer account number that resembles a credit card number, the customer account number having a five- to seven-digit prefix, a four-digit customer identification number, a four- to six-digit portion for the embedded code number, and a one-digit check sum.

32. A method as recited in claim 25, further comprising the step of displaying the customer account number with the embedded code number to the customer.

33. A computer-readable medium having computer-executable instructions for performing the steps in the method as recited in claim 25.

34. At an authority responsible for authorizing an online commerce transaction involving payment by an electronically transmitted account number, a computer-implemented method for handling an authorization request to honor the account number and accept payment, the authorization request involving a transaction number and containing transaction-specific data, the method comprising the following steps:

locating a customer account that is associated with the transaction number, the customer account having a customer-related secret associated therewith;

computing a test code number from the customer-related secret and the transaction-specific data; and comparing the test code number with a code number embedded in the transaction number to verify whether the transaction number was generated by a customer associated with the customer account.

35. A computer-implemented method as recited in claim 34, further comprising the following steps:

substituting a customer account number associated with the customer account in place of the transaction number; and processing the authorization request using the associated customer account number.

36. A computer-implemented method as recited in claim 35, wherein after the processing step, the method further comprising the following steps:

substituting the transaction number in place of the customer account number; and replying to the authorization request using the transaction number in lieu of the customer account number.

37. A computer-readable medium having computer-executable instructions for performing the steps in the computer-implemented method as recited in claim 34.

38. A computer programmed to perform the steps in the computer-implemented method as recited in claim 34.

39. A method for facilitating online commerce, comprising the following steps:

(A) conducting a registration phase between a customer and an issuing authority comprising the following steps:

(1) initiating, at the customer, a request for an online commerce card application;

(2) downloading software code from a card issuing authority to the customer to assist in completing the card application;

(3) submitting the application for the commerce card from the customer to the issuing authority;

(4) creating at the issuing institution a customer account for the customer, the customer account being associated with a customer identification number and a customer-related secret;

(5) providing to the customer the customer-related secret, a customer account number that includes the customer identification number, and proxy number generating code to create a code lumber based on the customer-related secret; and (6) providing to the customer software code that supports a user interface button to invoke a user interface for facilitating online commerce transactions;

(B) utilizing the online commerce card to conduct an online commerce transaction phase between the customer and a merchant comprising the following steps:

(1) generating the code number at the customer using the proxy number generating code and the customer-related secret;

(2) embedding the code number in the customer account number; and (3) sending the customer account number with embedded code number to the merchant to commence the online commerce transaction;

(C) conducting a payment authorization phase at the issuing authority in response to receiving an authorization request from the merchant to honor the transaction number and accept payment, the authorization request containing transaction-specific data, comprising the following steps:

(1) locating a customer account that is associated with the transaction number, the customer account containing the customer-related secret associated therewith;

(2) computing a test code number from the customer-related secret and the transaction-specific data; and (3) comparing the test code number with the code number embedded in the transaction number to verify whether the transaction number was generated by a customer associated with the customer account.

40. A system for facilitating online commerce, comprising:

a customer computing unit resident at a customer site, the customer computing unit being configured with an online commerce card for use in an online commerce transaction, the online commerce card being associated with a customer account number and a customer-related secret;

the customer computing unit being configured to generate a proxy number that resembles the customer account number but has embedded therein a code number derived at least in part on the customer-related secret, the customer computing unit submitting the proxy number to a merchant during the online commerce transaction; and an authority computing system resident at an authority site, the authority computing system having a database to hold the customer account number and the customer-related secret, the authority computing system being configured to receive from the merchant an authorization request for approval of the transaction number, the authority computing system verifying the transaction number based on the code number and the customer-related secret.

41. A system as recited in claim 40, wherein the customer computing unit computes the code number as a function of the customer-related secret and transaction-specific data.

42. A system as recited in claim 40, wherein the customer computing unit computes the code number as a cryptographic hashing function of the customer-related secret and transaction-specific data.

43. A system as recited in claim 40, wherein the customer computing unit generates a 16-digit customer account number that resembles a credit card number, but includes an embedded code number.

44. A system as recited in claim 40, wherein the customer computing unit generates a 16-digit proxy number that resembles a credit card number, the proxy number having a five- to seven-digit prefix, a four-digit customer identification number, a four- to six-digit code number, and a one-digit check sum.

45. In an online commerce system, a customer system for engaging in an online commerce transaction with a merchant, comprising:

a data storage for holding a private key and a customer account number;

a coding unit to create a code number as a function of the private key and transaction-specific data related to the online commerce transaction; and wherein the code number is embedded into the customer account number to form a transaction number for sending to the merchant to commence the online commerce transaction.

46. A customer system as recited in claim 45, wherein the coding unit creates the code number as a cryptographic hashing function of the private key and the transaction-specific data.

47. A customer system as recited in claim 45, wherein the resulting customer account number comprises a 16-digit customer account number that resembles a credit card number, but includes an embedded code number.

48. A customer system as recited in claim 45, wherein the resulting customer account number comprises a 16-digit proxy number that resembles a credit card number, the proxy number having a five- to seven-digit prefix, a four-digit customer identification number, a four- to six-digit code number, and a one-digit check sum.

49. In an online commerce system, a system for handling an authorization request to approve an electronically transmittable number, the request containing transaction-specific data, comprising:

a customer account manager to cross-reference a customer account using the transaction number and to look-up a customer-related secret associated with the customer account;

a coding unit to generate a test code number as a function of the customer-related secret and the transaction-specific data; and a comparator to compare the test code number to a code number embedded in the transaction number to verify the transaction number.

50. A system as recited in claim 49, wherein the customer account manager is configured to substitute the customer account number for the transaction number for processing.

51. A system as recited in claim 50, wherein the customer account manager is configured to reverse substitute the transaction number back for the customer account number after the processing.

52. A software program embodied on a computer-readable medium incorporating the system as recited in claim 49.

53. An electronically realizable commerce card embodied on a computer-readable medium comprising:

a first data field to hold a permanent customer account number having a predefined format that is recognized as an acceptable card number format;

a second data field to hold a temporary transaction number that serves as a proxy for the customer account number, the transaction number having some like digits and an identical format as the customer account number but including an embedded code number.

* * * * *